Dec. 23, 1958  H. D. EPSTEIN  2,866,039
HEATER-TYPE THERMOSTATIC SWITCH
Filed April 29, 1957

Henry David Epstein
Inventor
Koenig and Pope
Attorneys

United States Patent Office 2,866,039
Patented Dec. 23, 1958

2,866,039
HEATER-TYPE THERMOSTATIC SWITCH

Henry David Epstein, Cambridge, Mass., assignor to Metals & Controls Corporation, Attleboro, Mass., a corporation of Massachusetts Application April 29, 1957, Serial No. 655,753

7 Claims. (Cl. 200—122)

This invention relates to heater-type thermostatic switches and the like, and with regard to certain more specific features, to thermostatic switches in which the heaters are provided by resistance wire or the like.

Among the several objects of the invention may be noted the provision in a resistance-heated thermostatic switch of means for increasing the current that the heater may carry before the burnout will occur; the provision of such means which will not unduly increase the size of heater wire required for a given temperature-inducing effect on the thermostatic element of the switch; and the provision of means of the class described which is of simple and compact form requiring no increased switch size and making it particularly adaptable to high-capacity switches located in small housings. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, Fig. 1 is a plan view of a thermostatic switch with its cover and its thermostatic disc both removed therefrom;

Corresponding reference characters indicate corresponding parts throughout the several views of the drawings.

Figure 1:
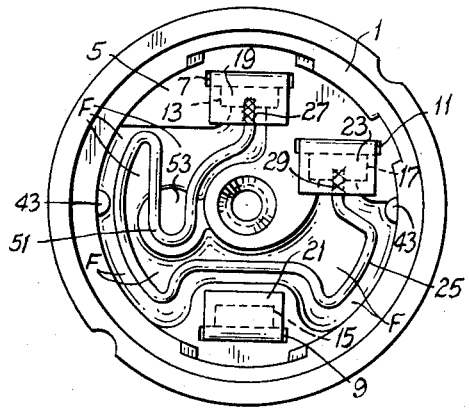
Figure 2:
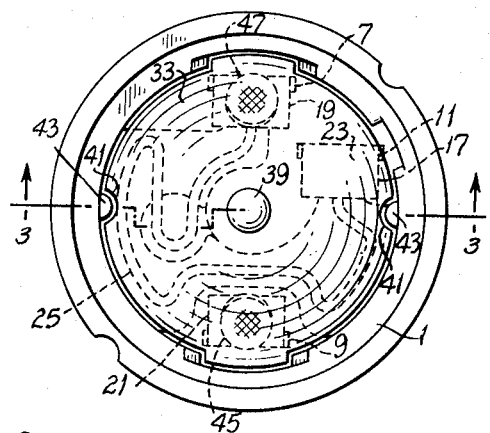
Fig. 2 is a view similar to Fig. 1, showing said disc in place.

Resistance heater wires are employed in thermostatic switches, including those that carry heating current in the thermostatic elements themselves, for the purpose of operating or aiding the operation of the thermostatic elements. Since the switches are often characterized by their high capacities and small sizes, it is desirable that the heater wires be as small as possible without making them unduly vulnerable to burnout. In order that the heater wires may be compactly arranged in the usually small switches, the wires are in many cases in serpentine form within the switch housing. Adjacent legs of the sharper loops in the serpentine shape tend mutually to interfere with radiation from one another, thus favoring localized heating and burnout at the sharper of such loops. Moreover, such loops are generally located at substantial distances from the ends of the heater wire, which minimizes the rate of heat conduction from the loop to the wire ends where they are joined with the switch terminals, which also favors localized overheating at the loop. In addition, such wires, prior to being bent and inserted into the switch housings, have their cross sections controlled for calibration of current-heating effects by stretching them, so as to reduce their cross sections as required for proper heating under the current conditions desired. This stretching causes localized stresses, particularly in the smaller sections spaced from the ends of the wire and these stresses are increased by bending. Thus this method of calibration usually results in the smaller, more stressed cross sections being the general area in which said loop is located. The result of the existence of the above design factors is that the loop parts of the present-day thermostatic heater wires often prematurely burn out, and it is this tendency which the present invention minimizes without requiring any substantially larger heating wire for a given size or design of switch.

Referring now more particularly to the drawings, there is shown at numeral 1 a nonconductive switch housing in the form of a molded cup having a bottom 3 and an open top 5 adapted to receive a cover (not shown). Supported within suitable openings within the bottom 3 are conductive clips 7, 9 and 11. These form outside line terminals 13, 15 and 17, respectively. Two of these conductive clips 7 and 9 also form stationary inside contacts 19 and 21 within the housing 1. The other conductive clip 11 carries an inside portion 23 corresponding to the contacts 19 and 21, except that the portion 23 does not act as a contact. The members 19 and 23 form the terminals of a heater wire 25 welded thereto, as shown at 27 and 29, respectively. This wire is of the resistance type, such as "Nichrome" or the like.

Threaded through the bottom 3 is an adjustable supporting post 31 for a composite snap-acting conductive thermostatic disc 33. Any desired threaded adjustment of the post may be maintained by a lock nut 35, adjustments being accomplished by means of a flat 37. The thermostatic disc 33 is supported on the post by means of a fastener extending loosely through a central opening therein, as indicated at 39. The arrangement is such that the disc is held loosely captive on the end of the post 31 to permit reversal of curvature by snap action in the known way. It is provided with marginal notches 41 engaging loosely with ribs 43 formed oppositely on the inside of the housing 1 to prevent rotation while allowing snap action.

The disc 33 also carries contacts 45 and 47 on opposite sides (at a right angle to the notches 41). The so-called cold position of the thermostatic element 33 is shown in the drawings, wherein the contacts 45 and 47 engage contacts 19 and 21, respectively, thus closing a connected load circuit C. Thus load current is fed through the element 33. Current is also thereby sent in parallel through the heater wire 25 from terminal 13 to terminal 17, returning to the circuit through wire 49.

The design of the thermostatic element 33 and of the heater wire 25 is such that under normal load conditions the element 33 is insufficiently heated to change its position from that shown. If the current in circuit C becomes excessive, the temperature due to the sum of the resistance heating in the element 33 and of resistance-heated wire 25 causes the element 33 to function thermostatically to snap from the downwardly concave position shown to an upwardly concave position, thereby lifting the contacts 45 and 47 from the contacts 19 and 21, respectively. This opens the circuit C, depriving both the element 33 and heater wire 25 of current. Upon cooling, the circuit may automatically reclose if the element 33 is of the automatically reset type; or it may remain open until manually reclosed if the element 33 is of the manual reset type.

As seen best in Fig. 1, the heater wire is of such serpentine form as best to fit within the free space within the housing 1 under the element 33 and around the lower parts therein. This free space is indexed F at the various points where it appears in the drawings. Included in the serpentine outline of the wire 25 is usually a critical re-entrant loop or hairpin-turn portion 51 which, for the reasons above given, is subject to burnout in known switches of the type described.

Figure 3:
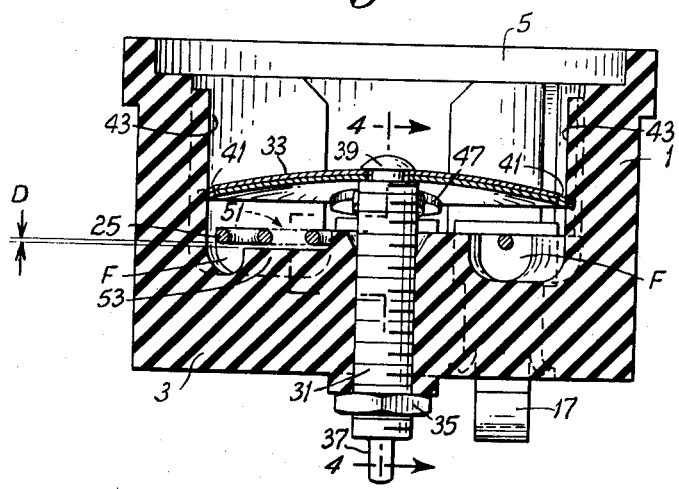
Fig. 3 is an enlarged vertical section taken on line 3—3 of Fig. 2.
Figure 4:
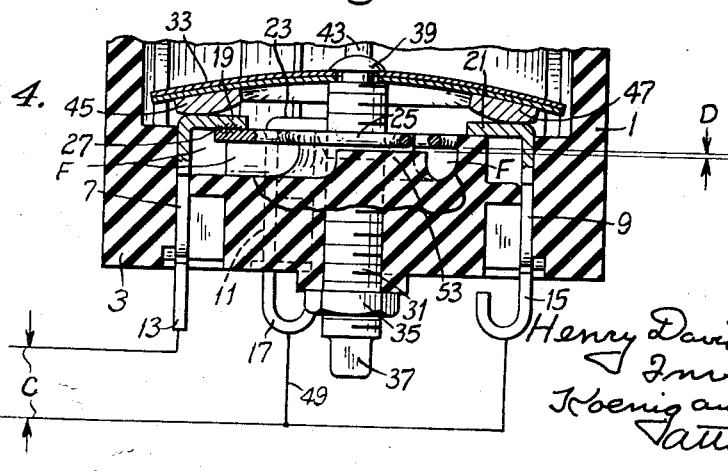
Fig. 4 is a vertical section taken on line 4—4 of Fig. 3.

According to my invention, burnout at this point is minimized by providing a cooling pad 53 in localized heat-exchange relationship with the region 51 of the wire 25. This is located on the side of the wire opposite the element 33. The surface of this pad 53 is closely adjacent to one side of the region 51 of the heating wire 25, the distance being in the range of .005"–.032", and preferably .005"–.015". Note that .032" is on the order of 1/32 inch. This dimension is indicated at D in Figs. 3 and 4. This close spacing assures rapid localized absorption of heat by direct radiation from the wire in the region at 51 to the pad or boss 53. Since the wire 25 has its serpentine shape arranged in a plane, it is preferable that the top of the cooling pad 53 be flat, and it is for such a condition that the above range of dimensions is preferred.

It will be appreciated that the location of the heater wire 25 between the boss 53 and transversely extending thermostatic element 33 is an advantage, since it places the cooler 53 in such a location that direct radiation from the entire extent of the heater to the thermostatic disc 33 is not interfered with. At the same time, rapid direct localized radiation may be picked up by the cooler 53 from the bottom of the wire.

Although a round wire is illustrated as exemplary of the plane heating element that may be used, it is to be understood that this may be a strip, ribbon or the like arranged in a plane. The term "wire" is used herein as characterizing each of these heater forms.

If, as shown, the cooling pad 53 is formed as an integral portion of the housing 1, then the housing, or at least that portion of it constituting the pad 53, should be molded of noninflammable ceramic-like material such as, for example, glass, steatite, aluminum oxide, glass-bonded mica or "Rosite." "Rosite" is a proprietary name for an inorganic plastic molded compound comprising calcium alumino-silicate which is reinforced with asbestos fibre having a microscopic grain and a stonelike constituency, made by the Rostone Corporation, of Lafayette, Indiana.

Instead of molding the pad 53 as part of the housing 1, it may be constituted by a material different from the housing and molded into the housing at the position shown in the drawing for boss 53. For example, the insert may be any suitable noninflammable heat-conductive material such as above described, or it may be a metal, alloy or the like. In this case the remainder of the housing 1 needs not to be composed of noninflammable material. In such case it may be made, as for example, of one of the usual thermosetting plastics usually used for constructing switch housings.

In view of the above, it will be seen that, by selective heat absorption, heat is abstracted from only that part of the heater wire which is most vulnerable to burnout. In other words, the wire is prevented from reaching a burnout temperature at its most vulnerable part. A distinction is to be drawn between the localized heat-absorbing means of the invention from heat-absorbing means that would abstract heat from substantially the entire length of the wire. The latter means would result in the requirement of a substantially larger heater wire in order to obtain the over-all temperatures necessary to the proper operation of the thermostatic element 33.

In view of the above, it will be seen that several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A heater-type thermostatic switch comprising a support, a thermostat carried on said support, a serpentine heating wire carried on the support and located between the support and the thermostat, said wire having a first side facing the thermostat in unobstructed radiant heat-exchange relation and having second side facing the support, a loop included in the wire, said loop normally being more likely to burn out than any of the remainder of the wire, and a localized projection from said support extending toward that side of the loop which is opposite the side that is in heat-exchange relation to the thermostat, said projection, without interfering with direct radiation between the wire and the thermostat, being adapted more nearly to equalize the burnout characteristics of the loop with those of the remainder of the wire.

2. A heater-type thermostatic switch comprising a support, a transversely extending thermostat carried on said support at a distance therefrom, a serpentine heating wire carried by said support in a transverse plane between the support and said thermostat, said wire being located in unobstructed heat-exchange relation to said thermostat, a plane loop normally more likely to burn out than any of the remainder of the wire, and a localized projection from said support having a substantially flat end lying parallel to the plane of the loop and in localized close radiant heat-exhange relation to the side of the loop opposite the thermostat and by localized heat absorption adapted substantially to minimize the likelihood of normal burnout at the loop without interfering with direct radiation between the wire and the thermostat.

3. A heater-type thermostatic switch made according to claim 2, wherein the distance between said plane end and said loop is on the order of 1/32" or less.

4. An enclosed heater-type thermostatic switch comprising a cup-shaped housing, a post extending from the bottom of the cup, a thermostat in the form of a snap-acting disc carried near the end of the post and extending transversely to the post, a serpentine heating wire located in heat-exchange relation to said thermostat and extending around the post in a plane transverse thereto and positioned between the cup bottom and the disc, the wire having a local loop composed of adjacent portions in the plane of the wire and distant from the wire ends, said loop being normally more likely to burn out than the remainder of the wire, and a localized projection from the bottom of the cup having a substantially plane end lying parallel to and in close localized radiant heat-exchange relation with respect to the bottom side of said loop and adapted to minimize the likelihood of said burnout of the loop.

5. A heater-type thermostatic switch made according to claim 4, wherein said housing is composed of fireproof ceramic-like material and said projection is constituted by an integral part thereof.

6. A heater-type thermostatic switch made according to claim 4, wherein said support is constituted by a thermosetting plastic and said projection is a noninflammable insert in said bottom.

7. A heater-type thermostatic switch made according to claim 6, wherein said noninflammable insert is constituted by a metal.

References Cited in the file of this patent

UNITED STATES PATENTS

| | | |
|---|---|---|
| 1,501,017 | Hall | July 8, 1924 |
| 1,980,756 | Hoover | Nov. 13, 1934 |
| 2,266,188 | Foley et al. | Dec. 16, 1941 |
| 2,439,338 | Fuge et al. | Apr. 6, 1948 |

FOREIGN PATENTS

| | | |
|---|---|---|
| 605,950 | Great Britain | Aug. 4, 1948 |